Patented Feb. 15, 1949

2,461,508

UNITED STATES PATENT OFFICE 2,461,508

FRICTION ELEMENT COMPRISING DISCRETE PARTICLES OF INSOLUBLE FURFURALDEHYDE KETONE RESIN

Mortimer T. Harvey, South Orange, N. J., assignor to Harvel Research Corporation, a corporation of New Jersey No Drawing. Application February 12, 1948, Serial No. 7,994

9 Claims. (Cl. 260—37)

This invention relates to novel friction augmenting materials and to friction elements in which said materials are components, and more particularly to those friction elements known as brake linings and clutch facings. In one of its more specific aspects the invention is directed to the friction augmenting materials and to brake linings employing one or more of said materials as components thereof and used in vehicles such as automobiles, airplanes and the like. This application is a continuation in part of my copending application No. 783,230 filed October 30, 1947 and in being a continuation in part of my application No. 484,230 filed April 23, 1943 now abandoned.

The friction augmenting material comprises a plurality of discrete particles obtained by comminuting a dry and substantially infusible solid product derived from a starting material which is an organic reaction product obtained by reacting under alkaline conditions furfuraldehyde and a ketone having a hydrogen atom on an alpha carbon and particularly those having two hydrogen atoms on an alpha carbon. The dry and substantially infusible solid product may be obtained by polymerizing with or without the aid of external heat, the starting material under acidic conditions such that the pH thereof is in the range of 0-4 and preferably 0.5-1.5. If desired said starting material may be polymerized under acidic conditions such that the pH thereof is no greater than 1.5 whereby the starting material is converted to a potentially heat reactive thermosetting resin and such resin in its intermediate state may be reacted with a reactive methylene group containing agent such as hexamethylene tetramine or an aldehyde such as formaldehyde and any of its polymers such as paraformaldehyde, trioxane or the like, glyoxal or its polymers, acetaldehyde or in the presence of either an acidic or alkaline catalyst; or when hexamethylene tetramine is used, no catalyst is necessary to provide a reaction product or a reaction-polymerization product which is a substantially infusible solid. When formaldehyde is used the ratio of that to the resin by weight is 2-100 to 15-100; and when any other reactive methylene group containing agent is employed, its quantity is the molecular equivalent of formaldehyde used in the aforesaid ratio range.

After any of the aforesaid substantially infusible products have been obtained they may be comminuted in any desired manner as by means of a hammer mill or the like to provide a mass of discreet substantially infusible solid particles whose size may be between a 10 mesh screen and a 200 mesh screen although it is preferable that the range of sizes be such that at least 90% by weight and preferably 95% by weight of the particles pass a 20 mesh screen and at least 95% by weight of the particles passing the 20 mesh screen are retained on a 200 mesh screen.

The novel brake linings and clutch facings comprise a heat resistant fibrous material, a binder and one of the aforesaid friction augmenting materials. These particles of friction augmenting materials are distributed as discrete particles as a discontinuous phase in the binder which is the continuous phase. These particles are substantially insoluble in the binder employed. The binder may be of a wide variety of compositions such as phenol-aldehyde, oleoresinous phenol-adlehyde resinous or other type of binder which is preferably in its infusible and ultimate state of cure. The binders which I prefer to employ are the infusible phenol aldehyde resins. Among some of the phenols which may be used for the production of the binder are hydroxy benzene, cresylic acid, meta-para cresol, cashew nut shell liquid, cardanol or any phenol or mixture of two or more of them which upon reaction with an agent containing a reactive methylene group such as an aldehyde, for example acetaldehyde, furfuraldehyde, formaldehyde, paraformaldehyde or the like or hexamethylene tetramine will produce a resin which is infusible in its ultimate state of cure. Instead of using a phenol aldehyde resin as a binder there may be used for this purpose a polymerizable drying fatty oil such as China-wood oil, linseed oil, oiticica oil, Perilla oil or the like either with or without resin modification.

The ketones preferably employed in the provision of said starting materials, namely said reaction products, are those having at least two hydrogen atoms on an alpha carbon. Examples of said ketones are acetone, methyl ethyl ketone, methyl isobutyl ketone, diacetone alcohol, isophorone, cyclohexanone, phorone, mesityl oxide, acetophenone, methyl n-amyl ketone, acetonyl acetone (hexandione 2,5), diethyl ketone and diisobutyl ketone.

The starting materials may be produced in an easy and simple manner. They may be produced either with or without the application of external heat. Generally in commercial production these starting materials are produced by adding an alkaline material to a mixture of furfuraldehyde and one or more of said ketones. Usually furfuraldehyde and a ketone or a mixture of ketones are mixed with each other and then there is added thereto a quantity of an alkaline material such as an aqueous solution of sodium hydroxide, potassium hydroxide, lime or the like. These components are mixed with each other in an autoclave or closed unit and shortly after the mixture takes place, an exothermic reaction occurs and sometimes the pressure within the autoclave will rise to a considerable degree. The reaction may be so vigorous as not to be easily controlled by ordinary methods such as by using reacting units which have air vents through the top because through such conditions many times there may be losses of some of the reaction products escaping through the air vents. For this reason an autoclave is recommended as the reacting unit. However, by choosing the reactants, by controlling the quantity of reactants, and the quantity of the alkaline material, it is possible to provide conditions such that no autoclave is required and some external heat will be desirable in order to obtain the reaction products in a relatively short period of time. Generally, however, the quantity of reactants as well as the quantity of alkaline material may be so chosen that a violent exothermic reaction will take place, all this being known to the art. After the exothermic reaction has subsided the reaction is practically complete. Then the entire mass may be externally heated to polymerize under alkaline conditions the compounds produced by the reaction. By this procedure there may be produced reaction masses of viscosities in the range of 50-5000 cp. at 25° C. which are to be used as the starting materials herein and consist chiefly of (1) a thermoplastic resin which is the alkali polymerization product of difurfural-ketone resin and (2) di-furfural ketone having the following formula:

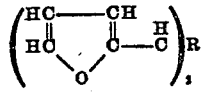

in which R is a ketone lacking two of the hydrogen atoms normally on either one or both of its alpha carbons with the quantity of said resin being 5%-50% by weight of the reaction mass. The difurfural ketone is produced as a result of reaction between the furfuraldehyde and ketone wherein two hydrogens on the alpha carbons unite with the oxygen of the aldehyde group of the furfuraldehyde to split off water.

In the production of the various starting materials of this invention, I prefer that the mole ratio of the furfuraldehyde to the ketones employed be in the range of 1-1 to 2-1 although this ratio may be as high as 8-1 depending on the ketone employed.

These various reaction products whose viscosities are preferably 50-5000 centipoises at 25° C. may be converted to the substantially infusible solid state either by polymerization under acidic conditions or by first polymerization under acidic conditions to provide thermosetting heat reactive resins which may be heat converted to the infusible state under acidic or alkaline conditions or may be subsequently reacted with an aldehyde to that state. The substantially infusible solid product produced by acid polymerization of the starting material may be accomplished with or without the aid of external heat. Generally, when no external heat is to be employed the starting material has a quantity of acidic agent added thereto in such amount that the pH of the mix is between 0 and about 0.35. This mix when allowed to stand at room temperature goes to the substantially infusible solid state. However, I prefer to add to the starting material a quantity of acidic agent such that the pH of the mix is in the range of 0.35-1.5 and preferably 0.5-1.5 which mix may be externally heated to provide a thermosetting heat reactive resin which may be poured into pars and cured to the substantially infusible state, or this thermosetting heat reactive resin may be reacted with an aldehyde or hexamethylene tetramine cured to the substantially infusible and solid state. The acidic agent which is preferably employed is an alkyl sulphate, such as diethyl sulphate or an aqueous solution of an acidic agent such as a mineral acid, examples of which are phosphoric acid, hydrochloric acid, sulphuric acid, di- or tri-chloracetic acid or an aqueous salt of an acid capable of providing the desired pH of the mixture. When external heat is applied, and necessary when the pH is 0.35-1.5, the temperature of the mix is maintained in factory practice in the range of 180° F.-260° F. and preferably 210° F.-250° F. to provide an easily controlled polymerization proceeding without reaction with other compounds because no other compounds are present and this I term homopolymerization.

The following Examples 1-16 are factory-feasible methods illustrating the manner for producing thermosetting heat reactive polymers produced by polymerizing various starting materials under acidic conditions.

*Example 1*

Since the production of some of these reaction products of furfuraldehyde and ketone under alkaline conditions are extremely violent, the following method is recommended in handling this reaction.

|  | Parts by weight |
|---|---|
| Furfuraldehyde | 96 |
| Acetone | 58 |
| 10% sodium hydroxide aqueous solution | 10 | are mixed together rapidly and put into an autoclave which will stand pressure up to 100 to 150 lbs. per square inch. The reaction is rapid. Usually about 3 minutes after the addition of the alkali, an extremely exothermic condition occurs and the pressure in the autoclave will rise to from 25 lbs. upwards. After the heat of the exothermic reaction has subsided, the reaction is practically complete, although a further heating to maintain the contents in the state of boiling for one hour is recommended. The mass may then be cooled to about room temperature and there is added thereto 6.5 parts by weight of a 50% by weight sulfuric acid water mixture. This mass, which is now on the acid side and has a pH of less than 3, is heated with stirring in an open kettle of the proper metal which would not be affected by the acid conditions, such as Monel metal, copper or stainless steel. The heating is continued up to an elevated temperature in the vicinity of 220° F. until the viscosity has reached the desired consistency and the mass is a thermosetting resin. This is then cooled rapidly and may be stored for use as mentioned above. The resultant product, hereinafter known as product A, is an intermediate or fusible thermosetting resin, soluble in acetone, insoluble in water, cures to an infusible state upon maintaining about 100 grams thereof for 12-16 hours at 100° C. either on the acid or alkaline side, reacts with paraformaldehyde and hexamethylene tetramine and has a specific gravity greater than 1.10.

*Example 2*

The same procedure is followed as set forth in Example 1 except that the furfuraldehyde has been doubled in quantity so that the reaction represents two moles of furfuraldehyde to one mole of ketone. 192 parts by weight of furfuraldehyde, 58 parts by weight of acetone and 10 parts by weight of a 10% aqueous solution of sodium hydroxide were used. The conditions and methods of handling were exactly the same as in Example 1. The finished product, hereinafter known as product B, is an intermediate or fusible thermosetting resin, soluble in acetone, insoluble in water, cures to an infusible state when about 100 grams thereof is maintained for 12 to 16 hours at 100° C. either on the acid or alkaline side, reacts with paraformaldehyde and hexamethylene tetramine and has a specific gravity greater than 1.10.

*Example 3*

| | Grams |
|---|---|
| Furfuraldehyde | 100 |
| Methyl isobutyl ketone | 100 |
| and a solution of | |
| Sodium hydroxide in 2 grams of water | 1 | were mixed together and a slight exothermic reaction took place. The mixture was heated to boiling and maintained in this state of boiling for about 3 hours under a reflux condenser after which the batch was neutralized with hydrochloric acid. After neutralization, 8 grams of a 50% by weight sulfuric acid-water mixture was added and the whole mass was heated with stirring at a temperature of approximately 200° F. until a sample thereof is a thermosetting resin. Then the resultant mass was cooled rapidly to room temperature and the resultant product, hereinafter known as product C, was a thermosetting fusible resin soluble in acetone, insoluble in water which cures to an infusible state upon maintaining 100 grams thereof at 100° C. for 12-16 hours either on the acid or alkaline side, reacts with paraformaldehyde and hexamethylene tetramine and has a specific gravity greater than 1.0.

*Example 4*

| | Grams |
|---|---|
| Furfuraldehyde | 200 |
| Diacetone alcohol (4-hydroxy-2-keto-4 methyl pentane) | 232 |
| and a solution of | |
| Sodium hydroxide in 1 gram of water | 1 | were mixed together and heated to boiling and maintained in the state of boiling for about one hour. At the beginning, the reaction was strongly exothermic. The reaction mixture was then neutralized with dilute sulfuric acid. After neutralization, 16 grams of a 50% by weight sulfuric acid-water mixture was added and the whole mass rapidly heated with constant stirring to approximately 260° F. Then it was rapidly cooled to room temperature and the resultant product, hereinafter known as product D, is an intermediate or fusible thermosetting resin, soluble in acetone, insoluble in water, cures to an infusible state when about 100 grams thereof is maintained for 12-16 hours at 100° C. either on the acid or alkaline side, reacts with paraformaldehyde and hexamethylene tetramine and has a specific gravity greater than 1.10.

*Example 5*

| | Grams |
|---|---|
| Furfuraldehyde | 100 |
| Isophorone | 138 |
| and a solution of | |
| Sodium hydroxide in 10 grams of water | 5 | were mixed together and placed under a reflux condenser. The mixture became hot on standing a few minutes. The mixture was then heated to boiling and maintained in this state of boiling under a reflux condenser for about one hour. Then it was neutralized with hydrochloric acid. After neutralization, 8 grams of a 50% by weight sulfuric acid-water mixture was added, the whole mass was rapidly heated with stirring to approximately 255° F. Immediately after reaching this temperature, the mass was rapidly cooled to room temperature and the resultant product, hereinafter known as product E, was an intermediate or fusible thermosetting resin, soluble in acetone, insoluble in water, cures to an infusible state upon heating about 100 grams thereof for 12-16 hours at 100° C. either on the acid or alkaline side, reacts with paraformaldehyde and hexamethylene tetramine and has a specific gravity greater than 1.0.

*Example 6*

| | Grams |
|---|---|
| Furfuraldehyde | 96 |
| Cyclohexanone | 98 |
| and a solution of | |
| Sodium hydroxide in 2 grams of water | 1 | were mixed together and placed under a reflux condenser. The mixture became hot and commenced boiling before heat was applied. Immediately after this boiling due to the exothermic reaction had subsided, heat was applied and the mixture was maintained in the state of boiling under said condenser for one hour. It was then neutralized wtih hydrochloric acid. After neutralization, 8 grams of a 50% by weight sulfuric acid-water solution was added thereto and the whole mass was heated rapidly to approximately 260° F. with constant stirring and when this temperature was reached, it was immediately cooled rapidly to room temperature. The resultant product, hereinafter known as product F, was an intermediate or fusible thermosetting resin soluble in acetone, insoluble in water, cures to an infusible state upon maintaining 100 grams thereof for 12-16 hours at 100° C. either on the acid or alkaline side, reacts with paraformaldehyde and hexamethylene tetramine and has a specific gravity greater than 1.10.

*Example 7*

| | Grams |
|---|---|
| Furfuraldehyde | 96 |
| Phorone | 138 |
| and a solution of | |
| Sodium hydroxide in 2 grams of water | 1 | were mixed together and placed under a reflux condenser. The mixture was heated to boiling and maintained in this state of boiling under said reflux condenser for about 1 hour and then neutralized with dilute sulfuric acid. After neutralization, 8 grams of a 50% by weight sulfuric-acid water mixture was added thereto and the whole mass was heated with stirring and maintained at a temperature of 230° F. until a thermosetting resin resulted. Then it was immediately cooled rapidly to room temperature and the resultant product, hereinafter known as product G, is an intermediate or fusible thermosetting resin soluble in acetone, insoluble in water, cures to an infusible state upon maintaining 100 grams thereof for 12–16 hours at 100° C. either on the acid or alkaline side, reacts with paraformaldehyde and hexamethylene tetramine and has a specific gravity greater than 1.10.

Example 8

| | Grams |
|---|---|
| Furfuraldehyde | 96 |
| Mesityl oxide | 98 |
| and a solution of | |
| Sodium hydroxide in 2 grams of water | 1 | were mixed together and placed under a reflux condenser. The mixture became hot on standing. Heat was then applied and the mass boiled and maintained in this state of boiling under said reflux condenser for about 1 hour. It was then neutralized with dilute sulfuric acid. After neutralization, 8 grams of a 50% by weight of a sulfuric acid-water mixture was added and the whole mass was heated with stirring to approximately 260° F. Immediately upon reaching said temperature, the mass was rapidly cooled to room temperature and the resultant product, hereinafter known as product H, was an intermediate or fusible thermosetting resin soluble in acetone, insoluble in water, cures to an infusible state upon maintaining 100 grams thereof for 12–16 hours at 100° C. either on the acid or alkaline side, reacts with paraformaldehyde and hexamethylene tetramine and has a specific gravity greater than 1.10.

Example 9

| | Grams |
|---|---|
| Furfuraldehyde | 96 |
| Acetophenone | 120 |
| and a solution of | |
| Sodium hydroxide in 2 grams of water | 1 | were mixed together and placed under a reflux condenser. The mixture became hot on standing at room temperature. Heat was then applied and the mass was boiled and maintained in this state of boiling under a reflux condenser for 1 hour. The mass was then neutralized with dilute sulfuric acid. After neutralization, approximately 8 grams of a 50% by weight sulfuric acid-water mixture was added and the whole mass was heated with stirring to approximately 225° C. Immediately upon reaching this temperature, the mass was cooled rapidly to room temperature. The resultant product, hereinafter known as product I, is an intermediate or fusible thermosetting resin soluble in acetone, insoluble in water, cures to an infusible state upon maintaining 100 grams thereof for 12–16 hours at 100° C. either on the acid or alkaline side, reacts with paraformaldehyde and hexamethylene tetramine and has a specific gravity greater than 1.10.

Example 10

| | Grams |
|---|---|
| Furfuraldehyde | 96 |
| Methyl n-amyl ketone | 114 |
| and a solution of | |
| Sodium hydroxide in 2 grams of water | 1 | were mixed together and placed under a reflux condenser. The mixture became hot on standing at room temperature. It was further heated to boiling and maintained in this state of boiling under a reflux condenser for 1 hour. The mass was then neutralized with dilute sulfuric acid. After neutralization approximately 8 grams of a 50% by weight sulfuric acid-water mixture was added and the whole mass was heated with stirring to approximately 260° F. Immediately upon reaching said temperature, the mass was then cooled to room temperature. The resultant product, hereinafter known as product J, was an intermediate fusible thermosetting resin soluble in acetone, insoluble in water, cures to an infusible state upon maintaining 100 grams thereof for 12–16 hours at 100° C. either on the acid or alkaline side, reacts with paraformaldehyde and hexamethylene tetramine and has a specific gravity greater than 1.10.

Example 11

| | Grams |
|---|---|
| Furfuraldehyde | 96 |
| Acetonylacetone (hexandione-2,5) | 114 |
| and a solution of | |
| Sodium hydroxide in 2 grams of water | 1 | were mixed together and placed under a reflux condenser. An extremely vigorous exothermic reaction set in immediately after the addition of the sodium hydroxide. After the exothermic reaction had subsided heat was applied and the mixture was kept in the state of boiling under said reflux condenser for 1 hour. An extremely viscous mass resulted and this mass was neutralized with dilute sulfuric acid. After neutralization, 4 grams of a 50% by weight sulfuric acid-water mixture was added and the whole mass was heated with stirring to approximately 260° F. Immediately upon reaching this temperature the mass was rapidly cooled to room temperature. The resultant product, hereinafter known as product K, is an intermediate or fusible thermosetting resin, soluble in acetone, insoluble in water, cures to an infusible state upon maintaining 100 grams thereof for 12–16 hours at 100° C. either on the acid or alkaline side, reacts with paraformaldehyde and hexamethylene tetramine and has a specific gravity greater than 1.10.

Example 12

| | Grams |
|---|---|
| Furfuraldehyde | 96 |
| Acetonyl acetone (hexandione-2,5) | 28 |
| and a solution of | |
| Sodium hydroxide in 2 grams of water | 1 | were mixed together and placed under a reflux condenser. A vigorous exothermic reaction took place. After the exothermic reaction had subsided heat was applied and the batch was heated to boiling and maintained in this state of boiling under said reflux condenser for 1 hour. Then it was neutralized with dilute sulfuric acid. After neutralization, 5 grams of a 50% by weight sulfuric acid-water mixture was added and the whole mass was heated with stirring to approximately 260° F. Immediately upon reaching said temperature, the mass was rapidly cooled to room temperature. The resultant product, hereinafter known as product L, was an intermediate or fusible thermosetting resin soluble in acetone, insoluble in water, cures to an infusible state upon maintaining 100 grams thereof for 12–16 hours at 100° C. either on the acid or alkaline side, reacts with paraformaldehyde and hexamethylene tetramine and has a specific gravity greater than 1.10.

Example 13

| | Grams |
|---|---|
| Furfuraldehyde | 96 |
| Acetonyl acetone | 14 |
| and a solution of | |
| Sodium hydroxide in 2 grams of water | 1 | were mixed together and placed under a reflux condenser. This mixture was heated to boiling and maintained in the state of boiling under said reflux condenser for 1 hour. The mass was then neutralized with dilute sulfuric acid. After neutralization, 5 grams of a 50% by weight sulfuric acid-water mixture was added and the whole mass was heated with stirring to approximately 255° F. Immediately upon reaching said temperature, the resultant mass was cooled rapidly to room temperature. The resultant product, hereinafter known as product M, is an intermediate or fusible thermosetting resin soluble in acetone, insoluble in water, upon maintaining 100 grams thereof for 12–16 hours at 100° C. it cures to an infusible state either on the acid or alkaline side, reacts with paraformaldehyde and hexamethylene tetramine and has a specific gravity greater than 1.10.

Example 14

| | Grams |
|---|---|
| Furfuraldehyde | 96 |
| Diethyl ketone | 86 |
| and a solution of | |
| Sodium hydroxide in 2 grams of water | 1 | were mixed together and placed under a reflux condenser. An exothermic reaction took place in the resulting mixture upon standing about 5 minutes at room temperature. After said exothermic reaction had subsided, heat was applied to maintain said batch in the state of boiling under said reflux condenser. The reaction mass was then neutralized with dilute sulfuric acid, and after neutralization, 7½ grams of a 50% by weight sulfuric acid-water mixture was added and the whole mass was heated with stirring to approximately 255° F. Immediately upon reaching said temperature, the resultant mass was rapidly cooled to room temperature. The resultant product, hereinafter known as product N, is an intermediate or fusible thermosetting resin soluble in acetone, insoluble in water, upon maintaining 100 grams thereof for 12–16 hours at 100° C. it cures to an infusible state either on the acid or alkaline side, reacts with paraformaldehyde and hexamethylene tetramine and has a specific gravity greater than 1.10.

Example 15

| | Grams |
|---|---|
| Furfuraldehyde | 96 |
| Di-isobutyl ketone | 142 |
| and a solution of | |
| Sodium hydroxide in 40 grams of water | 20 | were mixed together and placed under a reflux condenser. The mixture became hot on standing a short time at room temperature. Heat was applied and the mixture was boiled and maintained in this state of boiling under said reflux condenser for about 1 hour, after which considerable solid matter had settled at the bottom of the flask. The liquid portion was poured off and the remaining mass was neutralized with dilute sulfuric acid. After neutralization, sufficient hydrochloric acid was added to bring the pH value of the mass to around 0.5. It was then heated to around 260° F. to remove the water and polymerize to the desired viscosity. Immediately after reaching said temperature, the mass was rapidly cooled to room temperature. The resultant product, hereinafter known as product O, is an intermediate or fusible thermosetting resin soluble in acetone, insoluble in water, cures to an infusible state upon maintaining 100 grams thereof for 12–16 hours at 100° C. either on the acid or alkaline side, reacts with paraformaldehyde and hexamethylene tetramine and has a specific gravity greater than 1.10.

Example 16

| | | |
|---|---|---|
| Furfuraldehyde | grams | 96 |
| Methyl ethyl ketone | do | 72 |
| 2-n sodium hydroxide | cc | 12½ | were mixed together and placed under a reflux condenser and heated together whereby the mixture is boiled and maintained in this state of boiling under said reflux condenser for 1 hour after which time the mixture was neutralized with dilute hydrochloric acid. After neutralization, further hydrochloric acid was added to bring the pH to 0.5 and the mass was then heated to 220° F. with stirring to remove the water and polymerize to a heavy, thick thermosetting resin. Then it was rapidly cooled to room temperature. This resultant product, hereinafter known as product P, was an intermediate or fusible thermosetting resin soluble in acetone, insoluble in water, cures to an infusible state upon maintaining 100 grams thereof for 12–16 hours at 100° C. either on the acid or alkaline side, reacts with paraformaldehyde and hexamethylene tetramine and has a specific gravity greater than 1.10.

The various products A–P of Examples 1–16 may be converted to the infusible solid state by heating them under either acidic or alkaline conditions at a temperature of 200° F. or above. If desired, the cooling step may be omitted in each of the aforesaid examples and the hot resin is poured directly into pans and placed in a curing oven maintained at a temperature of at least 200° F. and allowed to remain there until cured to the infusible solid state.

The various products A–P may be mixed with a reactive methylene containing agent and under either acid or alkaline conditions and cured at a temperature of at least 200° F. to the infusible solid state or the hot resin of Examples 1–16 before the cooling step may be mixed with such an agent and cured under the same conditions.

These various products A–P either before or after the aldehyde addition and before the heat curing step may have added thereto 1–50% by weight of a modifier, such as styrene, residues from styrene stills, normally solid polyvinyl esters, copolymers thereof, or polyvinyl acetals such as polyvinyl acetate, polyvinyl chloride, copolymers of vinyl chloride and vinyl acetate, polyvinyl acetal, polyvinyl formal, polyvinyl butyral, etc. These modifiers may be heat dissolved therein and then the mass is converted to the infusible state.

All of these various substantially solid resins however produced may be comminuted by means of a hammer mill or ball mill to provide a mass of discrete particles, at least 90% and preferably 95% of which by weight passes a 20-mesh screen and 95% of which by weight is retained on a 200-mesh screen and such comminuted masses are hereinafter known as product X.

In the production of friction elements a wide variety of materials may be employed with the main combination of a heat resistant fibrous material, binder and friction augmenting particles. In general a brake lining is produced by first forming an intimate and uniform mixture of the following components, preferably in the stated proportions, all parts being given by weight.

| | Parts |
|---|---|
| Any one or a mixture of two or more of the products X | 3–15 |
| Binder and preferably a phenol-aldehyde or an oil modified phenol-aldehyde resin in its thermosetting heat reactive state | 15–30 |
| Heat resistant fibrous material and preferably asbestos | 30–50 |

Other ingredients, such as sulphur, carbon black, barytes, zinc oxide, charcoal, graphite, etc. may be added if desired depending upon the particular type of brake lining desired.

In preparing the mixture I prefer that the binder, in its intermediate state, be in such comminuted form that most, if not all of it passes a 100-mesh screen. After said mixture is prepared it is pressed, extruded or sheeted through rolls, and shaped at such elevated temperatures that the binder is fused at least in part to obtain a partial setting. Then the mass is baked in an oven at elevated temperature over an extended period of time until substantially all of the binder is "kicked over" or has been converted to its ultimate state, thus rendering it substantially infusible. In the course of said mixing, shaping, partial setting and final curing steps the product X will not be dissolved in the binder. The brake lining so produced comprises essentially a heat resistant fibrous material, a substantially infusible binder of polymerized organic material having substantially distributed therethrough discrete particles of comminuted material of such size that 90% by weight of a mass thereof is capable of passing a 20-mesh screen and at least 95% by weight of the mass passing the 20-mesh screen will be retained on a 200 mesh screen and produced in the manner heretofore set forth.

Having thus described my invention what I claim is:

1. A friction element comprising asbestos, a binder, a mass of discrete particles in said binder, said particles being in the size range that at least 90% by weight of said mass will pass a 20-mesh screen and at least 95% by weight of said mass passing said screen will be retained on a 200-mesh screen, said particles comprising a solid substantially infusible resin selected from the group consisting of a resin produced by polymerizing under acidic conditions such that the pH thereof is no greater than 3 an organic reaction product produced by reacting under alkaline conditions furfuraldehyde and a ketone having a hydrogen atom on an alpha carbon, and a resin produced by curing under alkaline conditions a potentially heat reactive thermosetting resin produced by polymerizing under acidic conditions such that the pH thereof is no greater than 3 an organic reaction product produced by reacting under alkaline conditions furfuraldehyde and a ketone having a hydrogen atom on an alpha carbon.

2. A friction element comprising asbestos, a binder, a mass of discrete particles in said binder, said particles being in the size range that at least 90% by weight of said mass will pass a 20-mesh screen and at least 95% by weight of said mass passing said screen will be retained on a 200-mesh screen, said particles comprising a solid substantially infusible resin produced by polymerizing under acidic conditions such that the pH thereof is no greater than 1.5 an organic reaction product produced by reacting under alkaline conditions furfuraldehyde and a ketone having a hydrogen atom on an alpha carbon.

3. A friction element comprising asbestos, a binder, a mass of discrete particles in said binder, said particles being in the size range that at least 90% by weight of said mass will pass a 20-mesh screen and at least 95% by weight of said mass passing said screen will be retained on a 200-mesh screen, said particles comprising a solid substantially infusible resin produced by polymerizing under acidic conditions such that the pH thereof is no greater than 1.5 an organic reaction product produced by reacting under alkaline conditions furfuraldehyde and acetone.

4. A friction element comprising asbestos, a binder, a mass of discrete particles in said binder, said particles being in the size range that at least 90% by weight of said mass will pass a 20-mesh screen and at least 95% by weight of said mass passing said screen will be retained on a 200-mesh screen, said particles comprising a solid substantially infusible resin produced by polymerizing under acidic conditions such that the pH thereof is no greater than 1.5 an organic reaction product produced by reacting under alkaline conditions furfuraldehyde and methyl ethyl ketone.

5. A friction element comprising asbestos, a binder, a mass of discrete particles in said binder, said particles being in the size range that at least 90% by weight of said mass will pass a 20-mesh screen and at least 95% by weight of said mass passing said screen will be retained on a 200-mesh screen, said particles comprising a solid substantially infusible resin produced by polymerizing under acidic conditions such that the pH thereof is no greater than 1.5 an organic reaction product produced by reacting under alkaline conditions furfuraldehyde and diacetone alcohol.

6. A friction element comprising asbestos, a binder, a mass of discrete particles in said binder, said particles being in the size range that at least 90% by weight of said mass will pass a 20-mesh screen and at least 95% by weight of said mass passing said screen will be retained on a 200-mesh screen, said particles comprising a solid substantially infusible resin produced by curing under alkaline conditions a potentially heat reactive thermosetting resin produced by polymerizing under acidic conditions such that the pH is no greater than 1.5 an organic reaction product produced by reacting under alkaline conditions furfuraldehyde and a ketone having a hydrogen atom on an alpha carbon.

7. A friction element comprising asbestos, a binder, a mass of discrete particles in said binder, said particles being in the size range that at least 90% by weight of said mass will pass a 20-mesh screen and at least 95% by weight of said mass passing said screen will be retained on a 200-mesh screen, said particles comprising a solid substantially infusible resin produced by curing under alkaline conditions a potentially heat reactive thermosetting resin produced by polymerizing under acidic conditions such that the pH is no greater than 1.5 an organic reaction product produced by reacting under alkaline conditions furfuraldehyde and acetone.

8. A friction element comprising asbestos, a binder, a mass of discrete particles in said binder, said particles being in the size range that at least 90% by weight of said mass will pass a 20-mesh screen and at least 95% by weight of said mass passing said screen will be retained on a 200-mesh screen, said particles comprising a solid substantially infusible resin produced by curing under alkaline conditions a potentially heat reactive thermosetting resin produced by polymerizing under acidic conditions such that the pH is no greater than 1.5 an organic reaction product produced by reacting under alkaline conditions furfuraldehyde and methyl ethyl ketone.

9. A friction element comprising asbestos, a binder, a mass of discrete particles in said binder, said particles being in the size range that at least 90% by weight of said mass will pass a 20-mesh screen and at least 95% by weight of said mass passing said screen will be retained on a 200-mesh screen, said particles comprising a solid substantially infusible resin produced by curing under acidic or alkaline conditions a potentially heat reactive thermosetting resin produced by polymerizing under acidic conditions such that the pH is no greater than 1.5 an organic reaction product produced by reacting under alkaline conditions furfuraldehyde and diacetone alcohol.

MORTIMER T. HARVEY.

REFERENCES CITED

The following references are of record in the file of this patent:

UNITED STATES PATENTS

| Number | Name | Date |
|---|---|---|
| 2,164,326 | Harvey | July 4, 1939 |
| 2,383,790 | Harvey | Aug. 28, 1945 |